US011067243B2

(12) United States Patent
Czirmer et al.

(10) Patent No.: US 11,067,243 B2
(45) Date of Patent: Jul. 20, 2021

(54) OPAQUE OUTER LENS WITH INTEGRATED LIGHT ELEMENT

(71) Applicant: GM GLOBAL TECHNOLOGY OPERATIONS LLC, Detroit, MI (US)

(72) Inventors: Carlos N. Czirmer, Rochester, MI (US); Jodi M. Allen, Orion, MI (US); Martin J. Davis, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/717,449

(22) Filed: Dec. 17, 2019

(65) Prior Publication Data

US 2021/0180761 A1 Jun. 17, 2021

(51) Int. Cl.
| | |
|---|---|
| F21S 43/235 | (2018.01) |
| F21S 41/275 | (2018.01) |
| F21S 43/20 | (2018.01) |
| F21S 41/20 | (2018.01) |
| B60Q 3/62 | (2017.01) |
| F21S 43/245 | (2018.01) |
| F21S 43/237 | (2018.01) |
| F21S 43/236 | (2018.01) |

(52) U.S. Cl.
CPC ............ *F21S 41/275* (2018.01); *B60Q 3/62* (2017.02); *F21S 41/285* (2018.01); *F21S 43/235* (2018.01); *F21S 43/236* (2018.01); *F21S 43/237* (2018.01); *F21S 43/245* (2018.01); *F21S 43/255* (2018.01)

(58) Field of Classification Search
CPC .................. B60Q 3/62–66; F21S 41/24; F21S 43/235–251; F21S 43/237
See application file for complete search history.

(56) References Cited

U.S. PATENT DOCUMENTS

| | | | |
|---|---|---|---|
| 9,541,703 B2 | 1/2017 | Moriyama et al. | |
| 10,225,529 B2 | 3/2019 | Okumura | |
| 10,286,841 B2 | 5/2019 | Fries et al. | |
| 2018/0017226 A1 | 1/2018 | Valois et al. | |
| 2018/0112847 A1* | 4/2018 | Childress | G02B 6/0038 |
| 2018/0208108 A1 | 7/2018 | He et al. | |
| 2020/0070623 A1* | 3/2020 | Kim | B60H 1/3421 |
| 2020/0116323 A1* | 4/2020 | Nykerk | F21S 41/285 |

* cited by examiner

*Primary Examiner* — Sean P Gramling
(74) *Attorney, Agent, or Firm* — Quinn IP Law

(57) ABSTRACT

A light-emitting assembly includes an outer lens. The outer lens has a lens exterior surface and a lens interior surface. The outer lens also defines a window between the lens exterior surface and the lens interior surface. The light-emitting assembly additionally includes a light element fixed to the outer lens in the window. The light element is exposed on the lens exterior surface, and configured to direct a beam of light away from the outer lens exterior surface. Such a light-emitting assembly may be specifically adapted for use on a motor vehicle.

12 Claims, 3 Drawing Sheets

OPAQUE OUTER LENS WITH INTEGRATED LIGHT ELEMENT

INTRODUCTION

The disclosure relates to an opaque outer lens with integrated light element, such as for a motor vehicle exterior lighting system.

Motor vehicles are typically equipped with exterior lighting systems to provide exterior illumination for the operator to safely operate the vehicle in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle, for example, to operators of other, approaching vehicles.

Vehicle lighting systems generally include an array of lamp assemblies mounted or integrated to the front, sides, top, and rear of the vehicle. Such an array of lamp assemblies typically includes headlamps arranged to illuminate the road ahead of the vehicle, turn signals arranged to signal the vehicle's intended maneuvering and direction of travel, roof and side marker lamps intended to make visible the vehicle's location and taillamps, typically defining brake lights for signaling to the rear of the vehicle that the vehicle is slowing or stopping. Such lamp assemblies may employ various light source technologies, for example, incandescent bulbs, halogen, high intensity discharge (HID), and light-emitting diodes (LEDs).

SUMMARY

A light-emitting assembly includes an outer lens. The outer lens has a lens exterior surface and a lens interior surface. The outer lens also defines a window between the lens exterior surface and the lens interior surface. The light-emitting assembly additionally includes a light element fixed to the outer lens in the window. The light element is exposed on the lens exterior surface, and configured to direct a beam of light away from the outer lens exterior surface.

The outer lens may be opaque, such that the lens exterior surface does not pass light to the lens interior surface.

The light element may be integrated into and retained by the lens.

The light-emitting assembly may be configured to define a tail lamp of a motor vehicle.

The light-emitting assembly may be configured to define a headlamp of a motor vehicle.

The light-emitting assembly may be configured to define a Center High Mount Stop Lamp (CHMSL) of a motor vehicle.

The light element is configured as a light bar or a light pipe.

In a cross-sectional side view, the outer lens may include lens material projections directed from the lens exterior surface toward the lens interior surface and configured to retain the light element in the window.

The light element may be arranged flush with the lens exterior surface, recessed in, or standing proud from the lens exterior surface.

The light-emitting assembly may additionally include a light source configured to generate light source energy and direct the light source energy into the light element.

The lens exterior surface may have a shape defining a 90-degree corner. The window may extend around the 90-degree corner, and the light element may fill the window, including around the 90-degree corner.

A motor vehicle employing such a light-emitting assembly is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
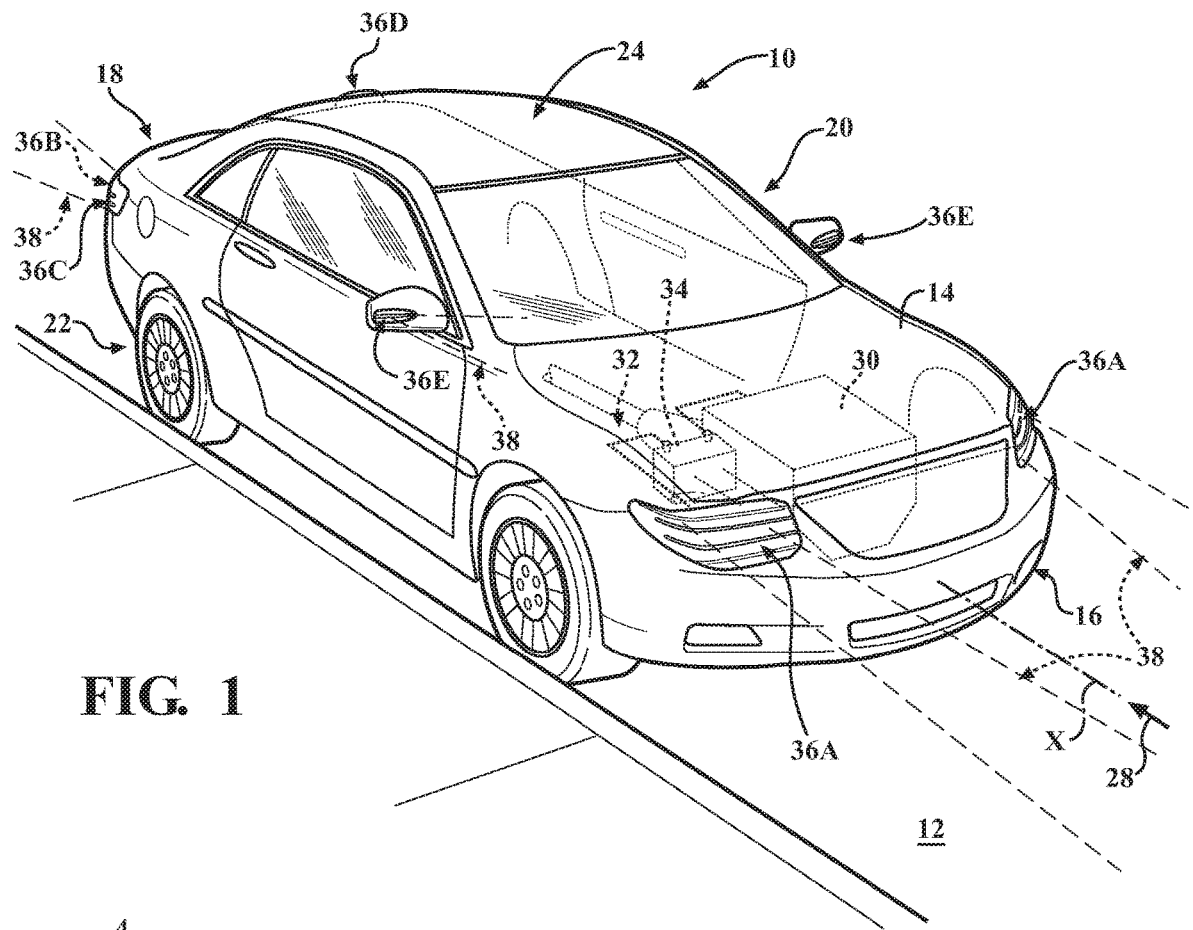
FIG. 1 is a schematic perspective illustration of a motor vehicle having a vehicle body and a plurality of light-emitting assemblies mounted to the vehicle body, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X and substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to the longitudinal axis X, and span the distance between the front end 16 and the rear end 18. The vehicle body 14 is defined to include the longitudinal axis X. A passenger compartment (not shown) of the vehicle 10 is generally bounded by the front and rear ends 16, 18 and the left and right sides 20, 22 of the body 14. The front end 16 is configured to face an oncoming ambient airflow 28 when the vehicle 10 is in motion relative to the road surface 12. When the vehicle 10 is in motion, the oncoming ambient airflow 28 moves substantially parallel to the body 14 and along the longitudinal axis X. As shown, the vehicle 10 may also include a powerplant 30, such as an internal combustion engine, a hybrid-electric powertrain (not shown), or other alternative types of propulsion systems.

As shown in FIG. 1, the vehicle 10 also includes an electrical system 32 having an energy storage device 34, such as one or more batteries, configured to accept an electric charge. The electrical system 32 is configured to supply electric current to operate vehicle systems, such as exterior lighting that includes a plurality of light-emitting assemblies, generally indicated in FIG. 2 by numeral 36, configured to generate respective light beams 38 (shown in FIG. 1). Other vehicle systems operable via the electrical system 32 may include heating/ventilation/air conditioning (HVAC), vehicle infotainment, as well as various on-board devices, such as a cellular telephone charger, etc., which are not shown.

As shown in FIG. 1, specific light-emitting assemblies providing exterior illumination for the motor vehicle 10 may define vehicle headlamps 36A, tail lamps 36B, stop lamps 36C, Center High Mount Stop Lamp (CHMSL) 36D, turn signals 36E, and front side, top, and rear side marker lamps (not shown). Such light-emitting assemblies 36 may indicate the host vehicle's presence, e.g., position, size, and direction of travel, as well as providing signaling functions to indicate the operator's intended maneuvering of the vehicle, for example, to operators of other, approaching vehicles. Although the present disclosure focuses on light-emitting assemblies 36 as employed for exterior lighting of motor vehicles, nothing precludes the light-emitting assembly having the construction described below from being employed in other, automotive or non-automotive, applications.

Generally, headlamps 36A are employed by the vehicle 10 to illuminate the road surface 12 ahead of the vehicle with projected and specifically aimed light beams 38. Tail lamps 36B are generally configured to signal presence of the host vehicle to the vehicle's rear. Tail lamps 36B are required to produce red light, and are wired such that they are lit whenever the headlamps 36A are on. Brake lights or stop lamps 36C, frequently incorporated into the tail lamp assemblies 36B, are activated with increased intensity, as compared with the rest of the tail lamp assembly, when the vehicle operator applies the subject vehicle's brakes. Generally, stop lamps 36C are configured as steady-burning lamps that are activated to provide a deceleration warning to drivers following the host vehicle.

The CHMSL 36D is mounted higher than the vehicle's stop lamps 36C, and is intended to provide a warning to drivers behind the vehicle 10 whose view of the vehicle's stop lamps is blocked by interceding vehicles. The CHMSL 36D also provides a redundant stop light signal in the event of a malfunction of the stop lamps 36C. The turn signals 36E are generally configured to signal the vehicle's direction of travel and intended maneuvering of the vehicle via repeating light beams. Turn signals 36E may be standalone units arranged anywhere on the vehicle body 14, or be incorporated into lighting assemblies including the headlamps 36A and/or the tail lamps 36B for signaling the vehicle's direction of travel to the respective front and rear of the host vehicle.

Each light-emitting assembly 36, such as the assemblies 36A, 36B, 36C, 36D, and 36E, includes an assembly housing 40 and an outer lens 42 affixed to the assembly housing, thereby defining an interior space 46 of the subject assembly. The outer lens 42 may be affixed to the assembly housing 40 via various methods, such as integrated snap-locks or stand-alone fasteners, or by being permanently fused thereto with structural adhesive or sealant, or permanently fused thereto through a welding process. The outer lens 42 includes a lens exterior surface 48 and a lens interior surface 50. The outer lens 42 defines a through window or aperture 52 extending between the exterior surface 48 and the interior surface 50, into the interior space 46. The light-emitting assembly 36 also includes a light element 54 fixed to the outer lens 42 in the window 52. The light element 54 may thus be integrated into and retained by the outer lens 42. Such an integrated outer lens 42 and light element 54 may be generated by a two-shot injection molding process.

In an exemplary embodiment, the light-emitting assembly 36 may be formed via a two-shot injection molding process. Specifically, the outer lens 42 may be formed in a first mold via a first shot of resin, cooled to form a solid part, including the window(s) 52, and then transferred to a second mold (or sufficiently rearranged in the first mold) to receive a second shot of resin to form light element(s) 54 in the window(s) 50. Alternatively, one or more light elements 54 may be formed in a first mold via a first shot of resin, cooled to form a solid part, and then transferred to a second mold (or sufficiently rearranged in the first mold) to receive a second shot of resin to form the outer lens 42, including the window(s) 52 surrounding the light element(s) 54. The two-shot injection molding process eliminates the need for additional fastening hardware to attach light element(s) 54 to the outer lens 42, which may create the appearance of outer lens hot-spots, as seen from outside the light-emitting assembly 36, when the assembly is turned on. Also, the two-shot injection molding process may permit stiffening features, e.g., ribs, gussets, etc., to be formed during the second shot of resin together with the light element(s) 54 in strategic locations along the window(s) 52, to thereby generate a more robust light-emitting assembly 36.

Figure 3:
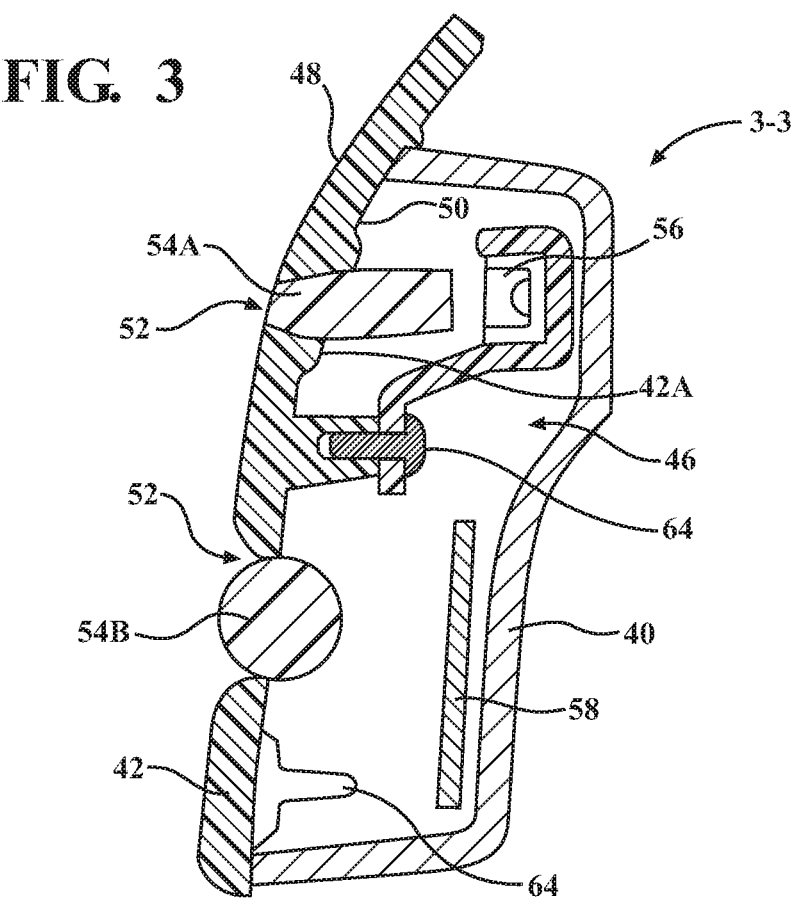
FIG. 3 is a schematic cross-sectional side view of the light-emitting assembly shown in FIG. 2.

The light element 54 is exposed to the ambient, i.e., vehicle surroundings, on the lens exterior surface 48, and is configured to generate the light beam 38 particular to the type of light-emitting assembly away from the lens exterior surface and the vehicle body 14. The light element 54 may be configured as a light bar 54A (either as a clear crystal or a tinted component) configured to focus the light beam 38, or a light guide or pipe 54B configured to transmit light across a predetermined span of the light-emitting assembly 36. The light element 54 is generally configured as either a transparent solid that contains the light transmitted therethrough by total internal reflection, or a hollow tube. As shown in FIG. 3, a particular light-emitting assembly 36 may include each of the light bar 54A and a light guide or pipe 54B. The light element 54 may be arranged flush with the lens exterior surface 48, recessed in the lens exterior surface, or stand proud from the lens exterior surface. FIG. 3 specifically illustrates the light bar 54A arranged flush with the lens exterior surface, while the light pipe 54B is shown recessed therein to expose more of the pipe's surface.

Figure 2:
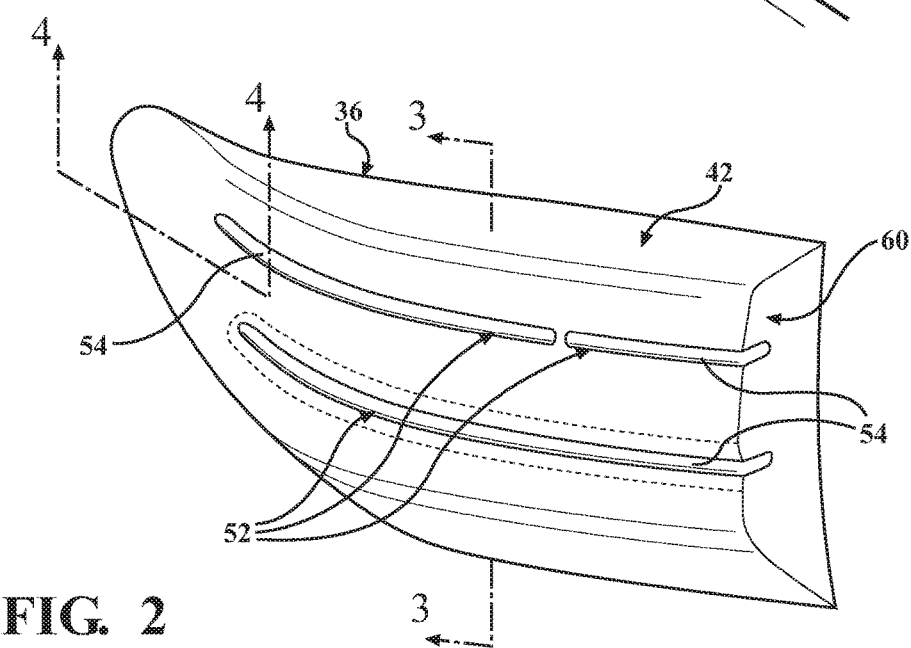
FIG. 2 is a schematic perspective view of a generalized light-emitting assembly shown in FIG. 1, including an outer lens defining a plurality of windows and different embodiments of light elements fixed to the outer lens in the windows, according to the disclosure.

As may be seen in FIG. 3, in a cross-sectional plane 3-3 indicated in FIG. 2, the outer lens 42 may include lens material projections 42A arranged on opposing edges of the window 52. As shown, the projections 42A are directed from the lens exterior surface 48 toward the lens interior surface 50 and configured to retain the light element 54, such as the light pipe 54B, in the window 52. The light-emitting assembly 36 additionally includes one or more light sources 56 connected to an electronic circuit board 58. The electronic circuit board 58 is connected to the electrical system 32. The electronic circuit board 58 and each light source 56 is fixed to and supported by the assembly housing 40. Each light source 56 is configured to generate light source energy and direct the energy into the light element 54.

Figure 5:
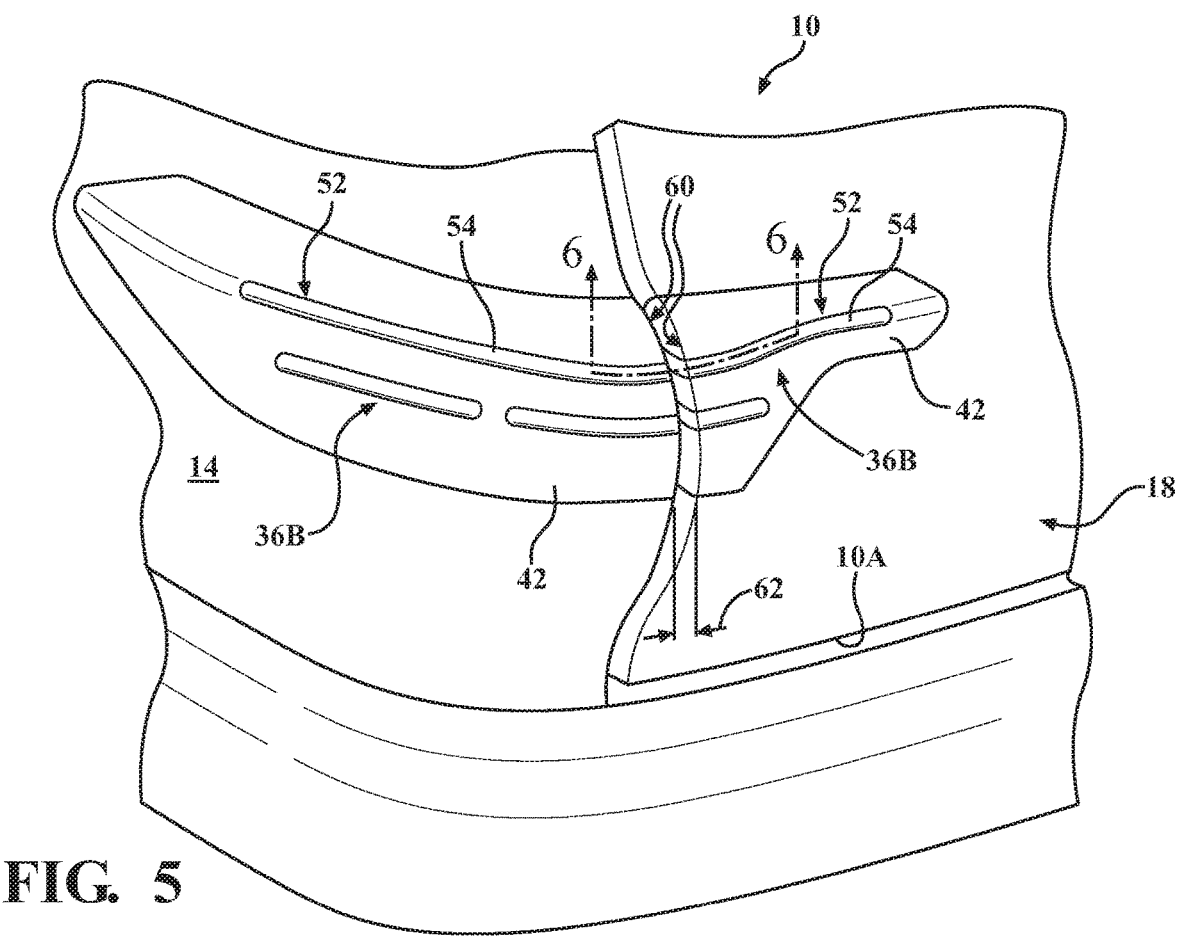
FIG. 5 is a schematic perspective rear view of a vehicle employing a lift-gate or deck-lid and having a corresponding tail lamp embodiment of the light-emitting assembly, according to the disclosure.
Figure 6:
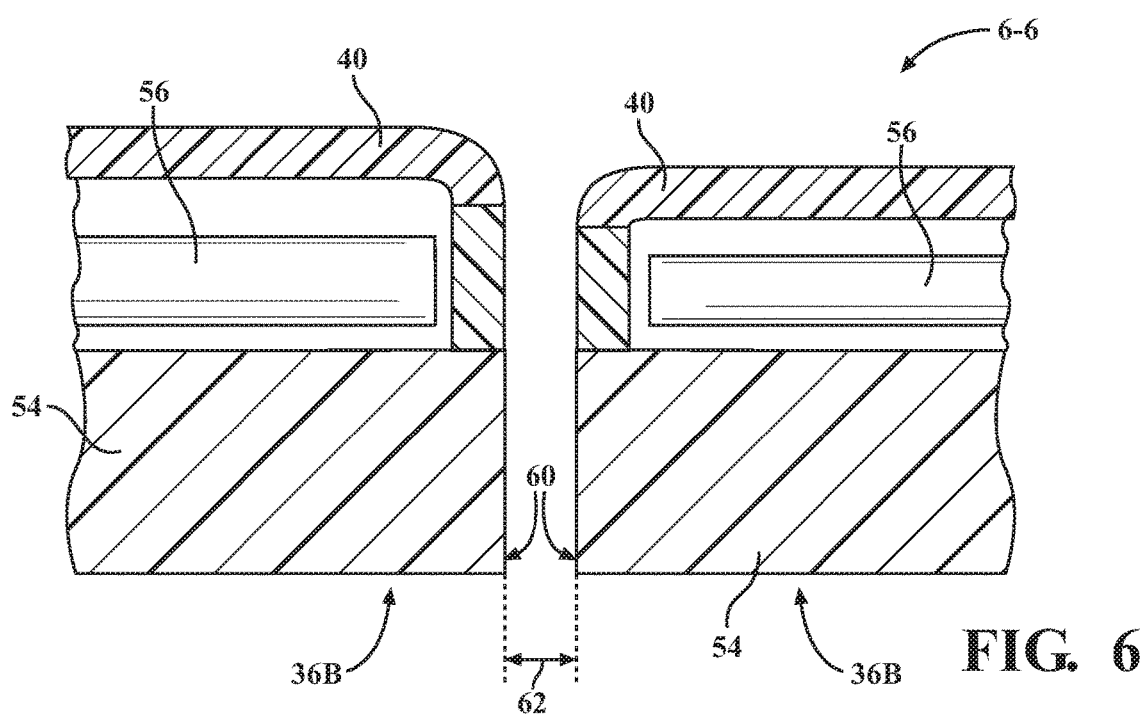
FIG. 6 is a schematic cross-sectional top view of the light-emitting assembly shown in FIG. 5.

As shown in FIG. 2, the opaque outer lens 42, and specifically the lens exterior surface 48, may have a shape 60 defining a substantially 90-degree corner. The window 52 extends around the 90-degree corner, and the light element 54 fills the window, including around the 90-degree corner. A light-emitting assembly 36, specifically the tail lamp 36B, with the opaque outer lens 42 having the shape 60 may be employed on a vehicle 10 having a lift-gate or deck-lid 10A (shown in FIG. 5). As may be seen in FIGS. 5 and 6, two light-emitting assemblies 36B, each having the shape 60, may be arranged adjacent to one another, separated by a gap 62 between the vehicle body 14 and the tail-gate or deck-lid 10A. The light elements 54 filling the windows 52 to the edges and around the 90-degree corner on each of the adjacent light-emitting assemblies 36 may permit visual perception of the gap 62 between the adjacent light elements 54 to be minimized. Specifically, when turned on, the adjacent light elements 54 may present the appearance of a near continuous light element across the gap 62. FIG. 6 depicts, in a cross-sectional plane 6-6 indicated in FIG. 5, the tail lamp 36B embodiment of the light-emitting assembly 36. A similar arrangement of light-emitting assemblies 36 may also be used for stylistic purposes on the front end 16 of the vehicle 10.

The light element 54 being fixed to the outer lens 42 in the window 52 rather than in the interior space 46 permits the interior space 46 to be reduced in size. Also, with the light element 54 being fixed to the opaque outer lens 42, such components as bezels, reflectors, and associated attachment hardware may be eliminated, as these elements cannot be seen from the outside of the light element 54, the interior space 46 may be further reduced in size, as compared with a light-emitting assembly that arranges its light element(s) between the outer lens 42 and the assembly housing 40. The overall mass of the light-emitting assembly 36 may also be reduced due to the elimination of such components.

Figure 4:
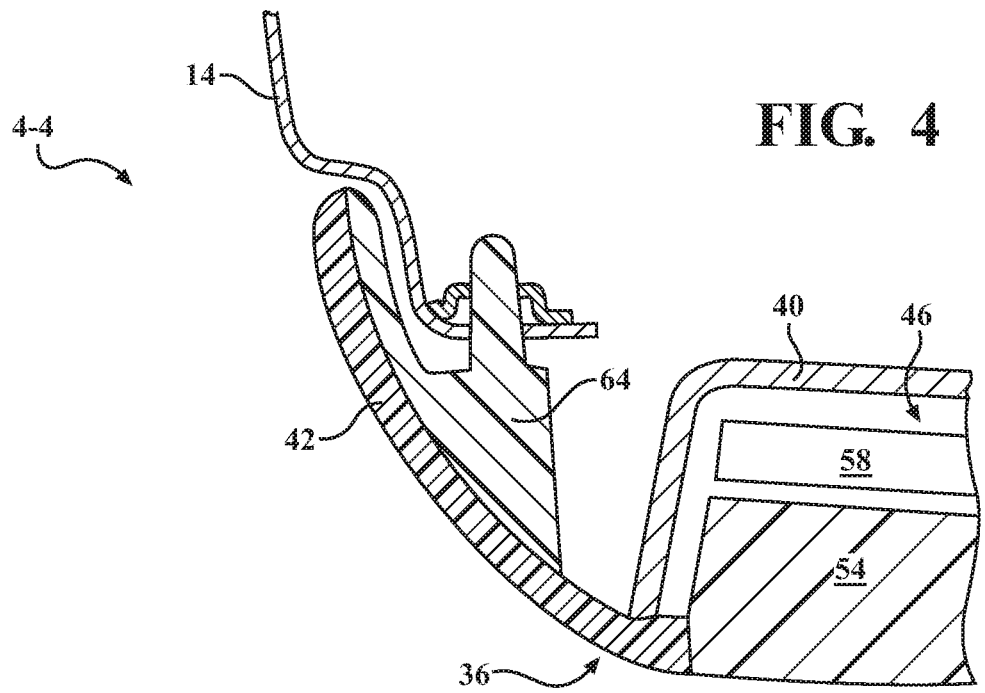
FIG. 4 is a schematic cross-sectional top view of the light-emitting assembly shown in FIG. 2

Also, as shown in FIG. 4, the assembly housing 40 may be physically smaller than outer lens 42, i.e., does not need to extend to the outer lens' edges. Such reduction in the size of the assembly housing 40 relative to light-emitting assemblies that arrange light element(s) between the outer lens and the assembly housing not only reduces mass and size, but enables a cleaner execution of the vehicle body 14 fender or quarter panel around and behind the corresponding light-emitting assemblies 36. Additionally, because the light element 54 is fixed to the outer lens 42, the outer lens may be opaque, i.e., non-transparent, such that the lens exterior surface 48 does not pass ambient light to the lens interior surface. As a result, internal components like the light sources 56, the electronic circuit board 58, and assembly attachment hardware 64 (shown in FIGS. 3 and 4) situated in the interior space 46 or between the opaque the outer lens 42 and the vehicle body 14 may be hidden from view by the opaque outer lens.

FIG. 4 depicts, in a cross-sectional plane 4-4 indicated in FIG. 2, the compact packaging of the light-emitting assembly 36 being enabled by the light element 54 fixed to the outer lens 42, together with the use of the opaque outer lens. In turn, compact dimensions of the light-emitting assembly 36 may permit more effective use of the space enclosed by the vehicle body 14. Meanwhile, the light element(s) 54 generate light beam(s) 38 unobscured and undimmed by having to be passed through another medium, such as the outer lens 42, prior to being projected away from the vehicle 10. Therefore, the light-emitting assembly 36 may generate brighter and sharper light beam(s) 38, while providing a cleaner look for the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A light-emitting assembly comprising:
   an outer lens having a lens exterior surface and a lens interior surface, and defining a window between the lens exterior surface and the lens interior surface; and
   a light element fixed to the outer lens in the window, exposed on the lens exterior surface, and configured to direct a beam of light away from the lens exterior surface;
   wherein:
   the light-emitting assembly is configured to define a tail lamp of a motor vehicle;
   the lens exterior surface has a shape defining a 90-degree corner;
   the window extends around the 90-degree corner; and
   the light element fills the window, including around the 90-degree corner.

2. The light-emitting assembly according to claim 1, wherein the outer lens is opaque, such that the lens exterior surface does not pass light to the lens interior surface.

3. The light-emitting assembly according to claim 1, wherein the light element is integrated into and retained by the outer lens.

4. The light-emitting assembly according to claim 1, wherein the light element is configured as a light bar or a light pipe.

5. The light-emitting assembly according to claim 1, wherein the light element is arranged flush with the lens exterior surface or recessed in the lens exterior surface.

6. The light-emitting assembly according to claim 1, wherein the light-emitting assembly additionally includes a light source configured to generate light source energy and direct the light source energy into the light element.

7. A motor vehicle comprising:
   a vehicle body arranged along a longitudinal axis and having a first vehicle body end configured to face oncoming ambient airflow when the vehicle is in motion relative to a road surface and a second vehicle body end opposing the first vehicle body end; and
   a light-emitting assembly mounted to the vehicle body, configured to direct a beam of light away from the vehicle body, and having:
   an outer lens having a lens exterior surface, a lens interior surface, and defining a window between the lens exterior surface and the lens interior surface; and
   a light element fixed to the outer lens in the window, exposed on the lens exterior surface, and configured to direct a beam of light away from the vehicle body;
   wherein:
   the light-emitting assembly is configured to define a tail lamp;
   the lens exterior surface has a shape defining a 90-degree corner;

the window extends around the 90-degree corner; and
the light element fills the window, including around the
90-degree corner.

8. The motor vehicle according to claim 7, wherein the outer lens is opaque (non-transparent/translucent), such that the lens exterior surface does not pass light to the lens interior surface.

9. The motor vehicle according to claim 7, wherein the light element is integrated into and retained by the outer lens.

10. The motor vehicle according to claim 7, wherein the light element is configured as a light bar or a light pipe.

11. The motor vehicle according to claim 7, wherein the light element is arranged flush with the lens exterior surface or recessed in the lens exterior surface.

12. The motor vehicle according to claim 7, wherein the light-emitting assembly additionally includes a light source configured to generate light source energy and direct the light source energy into the light element.

\* \* \* \* \*